Figure 1:
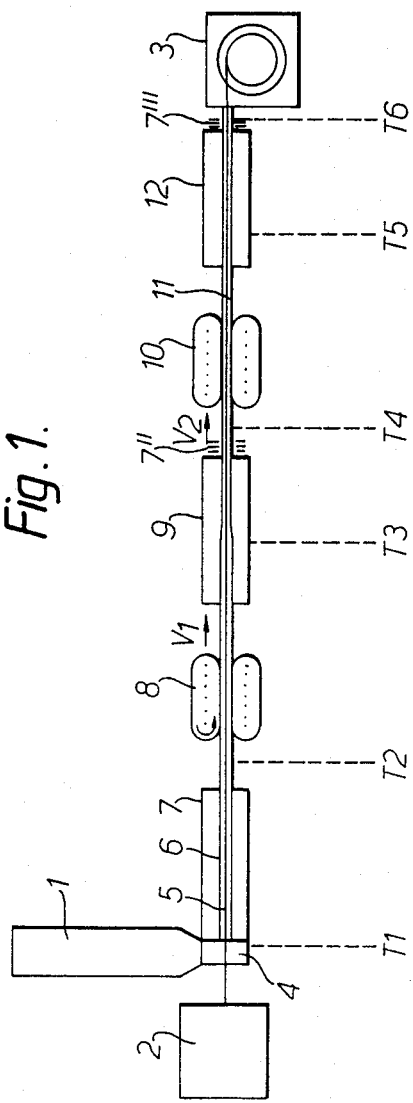

United States Patent [19]

Puckowski et al.

[11] Patent Number: 4,533,417

[45] Date of Patent: Aug. 6, 1985

[54] MANUFACTURE OF ORIENTED INSULATED WIRES AND CABLES

[75] Inventors: Robert T. Puckowski; Dennis Cooper, both of London; Patrick J. Duffy, Marlow, all of England

[73] Assignee: BICC Public Limited Company, London, England

[21] Appl. No.: 630,109

[22] Filed: Jul. 12, 1984

[30] Foreign Application Priority Data

Jul. 19, 1983 [GB] United Kingdom ............... 8319510

[51] Int. Cl.$^3$ ............................................ H01B 13/14
[52] U.S. Cl. ................................... 156/51; 156/229; 156/244.24; 264/210.1; 427/120
[58] Field of Search ............ 156/51, 165, 229, 244.24; 264/173, 209.5, 210.1; 427/120; 428/910

[56] References Cited

U.S. PATENT DOCUMENTS

| 3,503,818 | 3/1970 | Helbling et al. | 156/51 |
| 3,949,042 | 4/1976 | Utz | 264/173 |
| 3,950,469 | 4/1976 | Gneuss et al. | 264/209.5 X |
| 3,976,732 | 8/1976 | Herrington | 264/209.5 X |
| 4,320,224 | 3/1982 | Rose et al. | 528/125 |
| 4,331,624 | 5/1982 | Yazawa et al. | 264/160 |
| 4,451,306 | 5/1984 | Verne | 156/51 |

FOREIGN PATENT DOCUMENTS

| 971227 | 9/1964 | United Kingdom . |
| 1016245 | 1/1966 | United Kingdom . |
| 1019266 | 2/1966 | United Kingdom . |
| 1019458 | 2/1966 | United Kingdom . |
| 1078234 | 8/1967 | United Kingdom . |
| 1086021 | 10/1967 | United Kingdom . |
| 1102679 | 2/1968 | United Kingdom . |
| 1153035 | 5/1969 | United Kingdom . |
| 1153527 | 5/1969 | United Kingdom . |
| 1164817 | 9/1969 | United Kingdom . |
| 1177183 | 1/1970 | United Kingdom . |
| 2110934 | 6/1973 | Fed. Rep. of Germany . |
| 1383393 | 2/1975 | United Kingdom . |
| 1387303 | 3/1975 | United Kingdom . |
| 1414421 | 11/1975 | United Kingdom . |
| 1414422 | 11/1975 | United Kingdom . |
| 1414423 | 11/1975 | United Kingdom . |
| 1599106 | 9/1981 | United Kingdom . |

Primary Examiner—Robert A. Dawson
Attorney, Agent, or Firm—Parkhurst & Oliff

[57] ABSTRACT

A method of making insulated wires or cables in which a tube of crystallizable polymeric material is first extruded over size on the wire, cooled until it can be gripped and then reheated and stretched to produce crystalline orientation and to collapse it into contact with the wire is distinguished by first holding the tube at a temperature between its glass transition temperature and its crystalline melting point long enough for the degree of crystallinity to be significantly increased. Physical properties after orientation are considerably improved.

5 Claims, 2 Drawing Figures

MANUFACTURE OF ORIENTED INSULATED WIRES AND CABLES

This invention relates to a method for the manufacture of insulated electric wires and cables and to the products of the method. More particularly it is concerned with wires and cables insulated and/or sheathed with a crystallisable polymeric material, by which is meant a polymeric material which, after suitable processing, has a crystalline structure in at least part of its volume.

It is known that the physical and chemical properties of fibres or filaments made of many crystallisable polymers can be substantially improved by introducing a controlled degree of crystalline orientation in the axial direction. Such orientation is obtained by a process involving stretching the fibre or filament above the glass transition temperature but below its melting temperature range. Similarly the properties of film can be enhanced by uniaxial or by bi-axial stretching. Such stretching of the polymer produces shear-induced crystalline orientation. Orientation of this type is usually accompanied by an increase in density (crystallisation and/or tighter packing of the polymer chains) and manifests itself in characteristic X-ray diffraction patterns. The resulting product is mechanically anisotropic, and may show substantial changes in mechanical properties e.g. increases in modulus and tensile strength, as well as changes in chemical properties, such as improved solvent resistance and dye absorption characteristics.

In the specification of our United Kingdom Pat. No. 1599106, we have described how to introduce crystalline orientation of this type into insulation of electric wires and cables made from certain of these polymers and thereby obtain useful improvements in the mechanical and chemical properties of the insulation, and especially improved resistance to stress cracking especially in the presence of aggressive industrial fluids.

The method of continuously manufacturing an electric wire or cable there described comprises: advancing a core comprising at least one conductor (with or without pre-existing insulation as required) in the direction of its length; extruding around the core an oversize tube of a selected crystallisable polymeric material; cooling the extruded tube to form a first zone downstream of the extruder in which the temperature of the tube is low enough for it to be gripped (and preferably below the glass transition temperature) and in that zone gripping the tube to advance it at a first controlled speed; reheating the tube to form a second zone downstream of the first zone in which the temperature of the tube is above the glass transition temperature but below the melting temperature range of the polymer; stretching the tube in the second zone by advancing it (preferably by gripping means downstream of the second zone) at a second controlled speed which is from one and a half to ten times the first controlled speed; and collapsing the tube onto the core in or downstream of the second zone. When the collapsing step is to take place in the second zone it will normally be indistinguishable from the stretching step effected there.

We have now discovered that the properties of wires and cables insulated with crystallisable polymeric material can be still further improved and stabilised by an additional treatment prior to orientation and that the operation of the orientation process itself can also be stabilised.

The present invention is characterised by holding the extruded tube at a place upstream of the place in the first zone where it is gripped in a temperature range above the glass transition temperature but below the crystalline melting point for a time sufficient to produce a substantial degree of crystallinity in the material of the tube before it is stretched.

In some cases it may be sufficient to delay cooling after the tube emerges from the extruder but in most cases the tube will be heated upstream of the first zone.

We very much prefer that the extruded tube should first be cooled until it can be gripped and then gripped to control its speed, then heated and held in the required holding temperature range, and then cooled again before it enters the first zone; and preferably the speed of the tube where it is gripped before it enters the first zone is somewhat less than the speed established in the first zone, so that a small degree of stretching takes place in the holding temperature zone. Suitable heating means include high density hot liquid baths, heated fluidised beds, hot air chambers, and radiant heating zones.

The present invention is applicable to all crystallisable polymers suitable for wire and cable applications and to suitable polymer mixtures (including multiphase mixtures) in which at least one constituent polymer is crystallisable, but more especially to crystallisable polymers selected from:

Polyesters
Poly (ester-imides)
Poly (amide-imides)
Polyolefins (including polyethylene [especially high density type] and polypropylene and copolymers)
Polycarbonates
Polyphenylene oxides
Polysulphones
Polyvinylidene fluoride
Homopolymers and copolymers based on fluoro- and perfluoro-vinyl monomers and
Substantially linear aromatic homopolymers and copolymers consisting of chains of mono- or polycyclic aromatic groups linked by one or more of

—O—
—S—
—SO$_2$—

 where R = H or alkyl or acyl groups
—NHCO—

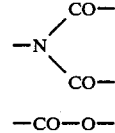

—CO—O— and other groupings including those containing P or P and N.

Preferred polymers of the last-mentioned group include those described in one or more of British Patent Specifications Nos. 971,227, 1,016,245, 1,019,266, 1,019,458, 1,078,234, 1,086,021, 1,102,679, 1,153,035, 1,153,527, 1,164,817, 1,177,183, 1,383,393, 1,387,303 and 1,414,421, 1,414,422 and 1,414,423. Particularly striking benefits have been obtained with a polymer of this class now commercially available from Imperial Chemical Industries plc under the designation "PEEK", which is believed to be a polyphenylene ether ketone having about two ether linkages for each ketone linkage (the designation is an acronym for the non-systematic name "polyether-ether-ketone"). For this commercial polymer, the glass transition temperature is about 143° C. and the crystalline melting point is about 334° C.; the preferred holding temperature range is 170°-300° C.

As explained in the specification of Pat. No. 1599106, it is in most cases desirable to "anneal" (or "heat set") the polymeric material after stretching by heating to a temperature above the stretching temperature but still below the melting temperature range, and often superior results can be obtained by stretching in two stages (or more) with intermediate annealing by repetition of the appropriate steps. To obtain reproducible results, the temperature of the second zone, or each such zone if there are two or more stretching stages, and of the annealing zone, and the associated elongation (the ratio of the second controlled speed to the first) will need to be precisely maintained; optimum values depend on the nature of the crystallisable polymer.

Whether the time and/or temperature of the distinguishing holding step of the present invention are critical depends on the thermodynamics and kinetics of crystallisation of the particular polymeric material; in the case of PEEK crystallisation is rapid once suitable conditions exist and holding times, beyond a short minimum, have little effect on the properties of the finished product, but the temperature may have a significant effect.

The method described can be used to make a wide range of insulated wires and cables for a variety of applications in industry and elsewhere, especially where wet dielectric strength and/or resistance to chemical attack are important. They can be used, for instance, in wiring buildings, aircraft, ships and vehicles, electrical equipment and appliances, telecommunication, as well as control and industrial power cables and "downwell" cables for the petroleum industry.

Figure 2:
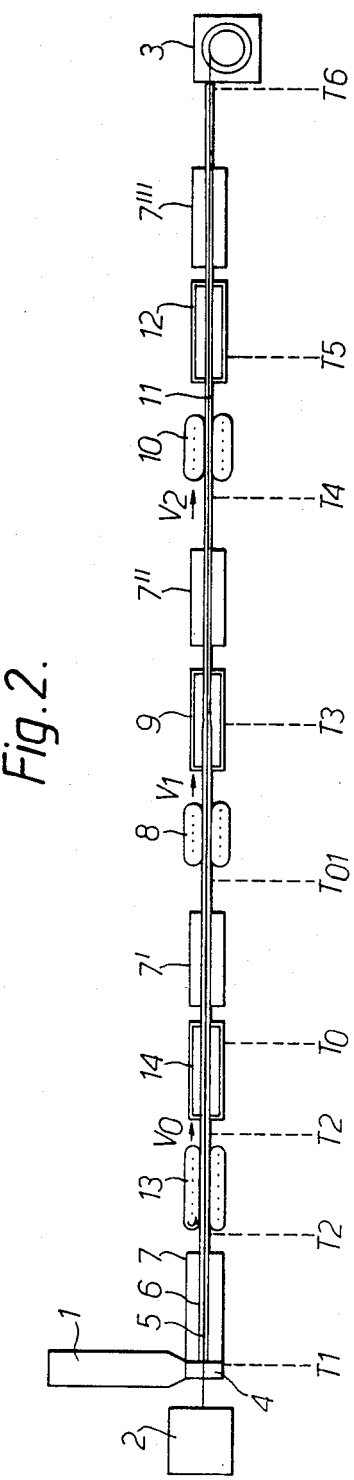

The invention will be further described, by way of example, with reference to the accompanying drawings in which FIG. 1 is a diagram of a wire-covering line for the operation of the process of UK Pat. No. 1599106 and FIG. 2 is a similar diagram showing the line modified for operation of the invention.

COMPARATIVE EXAMPLE

Throughout this example, the polymer used was "PEEK" as supplied (that is without any added ingredients).

For comparison, a flexible conductor made up of nineteen nickel-plated round copper wires and 0.118 mm in diameter (such as might be used to make an aircraft wiring cable) was covered with 0.2 mm radial thickness of polymer by extruding directly onto the wire using a Betol 18 mm diameter extruder fitted with a 20:1 length to diameter ratio screw of a design recommended for extruding nylon. The line speed was 50 mm/s and the melt temperature at the die ($T_1$) was estimated as 410° C. The product was immediately quenched in a water trough 1 m long at about 20 C, and the product (Product A) wound on a reel.

A second comparison product (Product B) was made by omitting the water trough and spacing the take-up reel at least 2 m from the extruder to allow slow cooling.

A third comparison product (Product C) was made using the line of FIG. 1.

This is arranged horizontally or vertically and includes the extruder 1 already described together with wire pay-off 2 and cable take-up 3 which are conventional. The extrusion conditions were as before and the initial internal and external diameters of the extruded tube were respectively 1.0 and 1.5 mm.

On emerging from the extruder crosshead 4 the wire 5 was centred in the extruded tube 6 sufficiently to prevent the tube sticking to the wire, and the tube cooled by a cooler 7, such as the water trough used previously, until it reaches a temperature $T_2 = 20°$.

At this temperature the tube can be gripped by a driven-belt traction device 8 without sticking or substantial permanent deformation. The speed $V_1 = 50$ mm/s of this traction device controls stretching of the tube 6 where its temperature is in or above the softening range at the outlet of the extruder die and thereby influences the wall thickness of the insulation being produced.

From the traction device 8 the tube, with the wire inside it, was passed to a stretching unit 9 comprising a hot-air chamber zone to raise the temperature of the polymer to a value $T_3 = 170°$ C. From the stretching unit the tube, still with the wire inside it, was pulled by another driven-belt traction device 10 located outside the stretching unit and sufficiently downstream of it to allow the tube to cool or be cooled (preferably a cooler 7" is used) to a temperature $T_4$ which is about 80° C. The traction device 10 was driven at a speed $V_2 = 112$ mm/s and the tube consequently stretched and the polymer oriented in the stretching unit 9 (being the place between the two traction devices where its temperature is highest and its strength consequently lowest) and at the same time the tube collapsed onto the wire.

Subsequently the covered wire 11 was heated in an annealer 12 to a temperature $T_5 = 250°$ C. before cooling by a further cooling trough 7''' to a temperature $T_6 = 20°$ C. for reeling of Product C in the take-up 3.

The line was now modified as shown in FIG. 2 by interposing an additional driven-belt traction device 13, heating chamber 14 and cooler 7' between the water trough 7 and the driven belt traction device 8. The chamber 14 is 1.8 m long and is heated by circulating hot air (or otherwise) to a temperature sufficient to heat the extruded tube to a temperature $T_o = 220°$ C. by the time it reaches the outlet end of the chamber; the traction device 13 operates at 48 mm/s and so a small degree of stretching takes place in the chamber 14. The degree of crystallinity after cooling to $T_{01} = 20°$ C. was determined as 28%. Subsequent processing to Product D was exactly as before. Test results for products A, B, C and D are given in Table 1 below

FURTHER EXAMPLES

The procedure described for production of Product D was repeated with a range of values of the numerical parameters. Overall diameters of the products reported were in the range 1-1.2 mm. Table 2 summarises the various production conditions and Tables 3 and 4 summarise the properties of the resulting products. (Examples 1 and 2 are products made without the temperature-holding step, for comparison). In the various temperature columns of Tables 2, the higher temperature designated A is the set temperature of the relevant chamber; the temperature designated B (where available) is a measured temperature of the polymer surface.

Measurements and observations recorded in the tables were made as follows:

(i) Temperatures all temperature measurements quoted in the comparative example and the 'B' temperatures in Tables 2A, B and C are polymer-surface temperatures as indicated by an infra-red thermal imaging/measurement system sold under the designation AGA-Thermovision 780.

(ii) Density

This was measured using a density gradient column as described in BS 2782: Part 6: Method 620D.

(iii) Crystallinity and Crystal Size

Data for crystallinity and crystal size measurement was obtained from wide angle X-ray diffractometry measurements. Crystallinity was evaluated according to the procedure of Hindeleh and Johnson (Polymer, 1972, Vol. 13, Pages 423–430) and crystal size by the Scherrer method (Emmett F. Kaelble, Handbook of X-Rays, McGraw Hill, 1967, Chapter 17).

(iv) Solvent Cracking

In this test six specimens of each of Products A, B, C and D were wound around mandrels having a diameter fourteen times that of the product and were placed two in each of three solvents for a period of one week, at room temperature. The solvents used were isopropanol, carbon tetra-chloride and iso-octane.

At the end of one week the specimens were examined for cracks under ×45 magnification and an assessment of the numbers of cracks per mm noted.

The values given in Table 1 are the average for the three solvents; those given in Table 3 are given separately for the three solvents in the order isopropanol, carbon tetra-chloride, iso-octane.

(v) Thermal Embrittlement

Three specimens of each of Products A, B, C and D were each wrapped so that there were ten turns on a mandrel having a diameter equal to that of the Product, and heated for 24 hours at 220 C.

The specimens were then cooled and unwound from the mandrel at room temperature at about 1 turn per second; and the number of cracks and/or splits (if any) found over the ten-turn length noted ('cracks' are traverse and 'splits' longitudinal; no cracks or splits were observed before unwinding).

The result quoted in the table is the average number of cracks for three specimens.

(vi) Electrical Breakdown

A one meter length of wire immersed in water or 5% salt solution was subjected to an electrical stress of 15 MV/m. The result quoted is the mean time to breakdown of ten specimens.

(vii) Retraction

A one meter length of wire was heated for two hours at 220° C. and, after cooling back down to room temperature, the shrinkage of insulation measured. The result quoted is the mean of two specimens tested.

(viii) Orientation Angle

Data for preferred orientation measurement was obtained using a wide angle x-ray diffractometer equipped with a goniometer stage. Measurements were made for the [110] and [200] crystal directions, from which the orientation distribution of the [001] direction (which coincides with the polymer chain axis in the crystal) was deduced. The results were expressed as an index number, called 'orientation angular spread' which is the mean angle between the axis of the wire and the polymer chain axis in the crystals. The index has the value 0° for perfect orientation of the polymer chains in all crystals parallel to the wire axis, and 60° for a random distribution of orientations.

TABLE 1

| PRODUCT | A | B | C | D |
| --- | --- | --- | --- | --- |
| Density (g/ml) | 1.267 | 1.295 | 1.298 | 1.302 |
| Crystallinity (%) | 1–2 | 21 | 26 | 35 |
| Solvent Cracking (crack per mm length) | 15 | 10 | 0 | 0 |
| Thermal Embrittlement (cracks per 10-turn length) | 10 | 10 | 2 | 0 |
| Time to Electrical Breakdown in Water (hours) | 24 | <30 | 126 | 234 |
| Time to Electrical Breakdown in Salt Solution (hours) | <20 | <20 | 44 | 94 |
| Solid-state Draw-down (Elongation %) | — | — | 100 | 100 |

TABLE 2

| Example No. | Holding Temperature T (°C.) | | Drawing Temperature $T_3$ (°C.) | | Drawdown Ratio % | Annealing Temperature $T_5$ (°C.) | |
| --- | --- | --- | --- | --- | --- | --- | --- |
| | A | B | A | B | | A | B |
| 1 | — | — | 250 | 180 | 100 | 350 | 250 |
| 2 | — | — | 250 | 185 | 125 | 350 | 250 |
| 3 | 300 | 208 | 250 | 196 | 100 | 350 | 261 |
| 4 | 350 | 222 | 250 | 190 | 100 | 350 | 254 |
| 5 | 400 | 285 | 250 | 180 | 100 | 350 | 254 |
| 6 | 300 | 214 | 300 | | 100 | 350 | |
| 7 | 300 | 268 | 300 | 232 | 100 | 350 | 254 |
| 8 | 350 | 260 | 300 | 260 | 100 | 350 | 255 |
| 9 | 400 | 285 | 300 | 224 | 100 | 350 | |
| 10 | 400 | 307 | 300 | 215 | 100 | 350 | 250 |
| 11 | 300 | 214 | 300 | 211 | 125 | 350 | 250 |
| 12 | 350 | 264 | 300 | 210 | 125 | 350 | 255 |
| 13 | 400 | 298 | 300 | 213 | 125 | 350 | 250 |
| 14 | 350 | 255 | 200 | 150 | 125 | 350 | 243 |
| 15 | 350 | 260 | 250 | 197 | 125 | 350 | 256 |
| 16 | 350 | 262 | 250 | 205 | 125 | 350 | 260 |
| 17 | 350 | 260 | 275 | 218 | 125 | 350 | 255 |
| 18 | 350 | 252 | 300 | 230 | 125 | 350 | 256 |

TABLE 3

| Example No. | Density g/ml | Retraction % | Orientation Angle Degree |
| --- | --- | --- | --- |
| 1 | 1.2978 | 0 | 12 |
| 2 | 1.2975 | 0 | 8 |
| 3 | 1.3007 | 0 | 24 |
| 4 | 1.3005 | 0 | 23 |
| 5 | 1.3031 | 4.5 | 34 |
| 6 | 1.3005 | 0.3 | 23 |
| 7 | 1.3030 | 0 | 25 |
| 8 | 1.3012 | 0.5 | 30 |
| 9 | 1.3035 | 4.7 | 35 |
| 10 | 1.3034 | 0.5 | 28 |
| 11 | 1.3003 | 0 | 14 |
| 12 | 1.3009 | 1.0 | 21 |
| 13 | 1.3041 | 0.6 | 17 |
| 14 | 1.3011 | 0.5 | — |
| 15 | 1.3021 | 0.1 | 17 |
| 16 | 1.3022 | 0.1 | 26 |
| 17 | 1.3019 | 1.8 | 29 |
| 18 | 1.3022 | 0 | 17 |

TABLE 4

| Example No. | Solvent Cracking No. of Cracks | Thermal Embrittlement Cracks | Thermal Embrittlement Splits |
| --- | --- | --- | --- |
| 1 | 0, 20, 0 | 2 | 8 |
| 2 | 0, 0, 0 | 2 | 12 |
| 3 | 0, 0, 0 | 0 | 0 |
| 4 | 0, 0, 0 | 0 | 0 |
| 5 | 0, 0, 0 | 0 | 0 |
| 6 | 0, 0, 0 | 0 | 0 |
| 7 | 0, 0, 0 | 0 | 0 |
| 8 | 0, 0, 0 | 0 | 0 |
| 9 | 0, 0, 0 | 0 | 0 |
| 10 | 0, 0, 0 | 0 | 1 |
| 11 | 0, 0, 0 | 1 | 15 |
| 12 | 0, 0, 0 | 0 | 6 |
| 13 | 0, 0, 5 | 2 | 12 |
| 14 | 0, 0, 0 | 0 | 24 |
| 15 | 0, 0, 0 | 0 | 5 |
| 16 | 0, 0, 0 | 0 | 0 |
| 17 | 0, 0, 0 | 0 | 0 |
| 18 | 0, 0, 0 | 0 | 0 |

What we claim as our invention is:

1. In a method of continuously manufacturing an electric wire or cable comprising advancing a core comprising at least one conductor in the direction of its length; extruding around the core an oversize tube of a selected crystallisable polymeric material; cooling the extruded tube to form a first zone downstream of the extruder in which the temperature of the tube is low enough for it to be gripped and in that zone gripping the tube to advance it at a first controlled speed; reheating the tube to form a second zone downstream of the first zone in which the temperature of the tube is above the glass transition temperature but below the melting temperature range of the polymer; stretching the tube in the second zone by advancing it at a second controlled speed which is from one and a half to ten times the first controlled speed; and collapsing the tube onto the core in or downstream of the second zone the improvement which comprises holding the extruded tube at a place upstream of the place in the first zone where it is gripped in a temperature range above the glass transition temperature but below the crystalline melting point for a time to produce crystallinity in the material of the tube before it is stretched.

2. A method as claimed in claim 1, wherein the extruded tube is heated at the said place upstream of the place in the first zone where it is gripped.

3. A method as claimed in claim 2 wherein the extruded tube is cooled and gripped it at a place upstream of the place in the first zone where it is gripped and the place where it is held in the said temperature range is located between those two said places.

4. A method as claimed in claim 3, wherein the speed of the extruded tube where it is gripped before it enters the first zone is less than the speed established in the first zone.

5. A method as claimed in claim 1 wherein the said polymer is a polyphenylene ether ketone having about two ether linkages for each ketone linkage.

* * * * *